United States Patent
Song et al.

(10) Patent No.: US 11,699,065 B2
(45) Date of Patent: Jul. 11, 2023

(54) ENSEMBLE OF CLUSTERED DUAL-STAGE ATTENTION-BASED RECURRENT NEURAL NETWORKS FOR MULTIVARIATE TIME SERIES PREDICTION

(71) Applicant: NEC Laboratories America, Inc., Princeton, NJ (US)

(72) Inventors: Dongjin Song, Princeton, NJ (US); Yuncong Chen, Plainsboro, NJ (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 473 days.

(21) Appl. No.: 16/984,359

(22) Filed: Aug. 4, 2020

(65) Prior Publication Data
US 2021/0042605 A1    Feb. 11, 2021

Related U.S. Application Data

(60) Provisional application No. 62/884,338, filed on Aug. 8, 2019.

(51) Int. Cl.
*G06N 3/02* (2006.01)
*G06N 3/044* (2023.01)
(Continued)

(52) U.S. Cl.
CPC .......... *G06N 3/044* (2023.01); *G06F 18/214* (2023.01); *G06F 18/23* (2023.01); *G06N 3/049* (2013.01); *G06N 20/20* (2019.01)

(58) Field of Classification Search
CPC ......... G06N 3/044–0455; G06N 3/049; G06N 20/00; G06N 20/20
(Continued)

(56) References Cited

U.S. PATENT DOCUMENTS

2018/0060666 A1* 3/2018 Song ................. G06V 10/82
2018/0189128 A1* 7/2018 Qiao ................. G06F 11/0727
2020/0380351 A1* 12/2020 Verma ................. G06N 3/044

OTHER PUBLICATIONS

Guo et al. "Multidimensional Time Series Anomaly Detection: A GRU-based Gaussian Mixture Variational Autoencoder Approach", 2018, Proceedings fo Machine Learning Research.*
(Continued)

*Primary Examiner* — Jue Louie
(74) *Attorney, Agent, or Firm* — Joseph Kolodka

(57) ABSTRACT

A method for multivariate time series prediction is provided. Each time series from among a batch of multiple driving time series and a target time series is decomposed into a raw component, a shape component, and a trend component. For each decomposed component, select a driving time series relevant thereto from the batch and obtain hidden features of the selected driving time series, by applying the batch to an input attention-based encoder of an Ensemble of Clustered dual-stage attention-based Recurrent Neural Networks (EC-DARNNS). Automatically cluster the hidden features in a hidden space using a temporal attention-based decoder of the EC-DARNNS. Each Clustered dual-stage attention-based RNN in the Ensemble is dedicated and applied to a respective one of the decomposed components. Predict a respective value of one or more future time steps for the target series based on respective prediction outputs for each of the decomposed components by the EC-DARNNS.

20 Claims, 9 Drawing Sheets

(51) Int. Cl.
  *G06N 3/049* (2023.01)
  *G06N 20/20* (2019.01)
  *G06F 18/23* (2023.01)
  *G06F 18/214* (2023.01)

(58) Field of Classification Search
  USPC .................................................. 706/12, 30
  See application file for complete search history.

(56) References Cited

OTHER PUBLICATIONS

Cao et al. "Financial times series forecasting model based on CEEDAN and LSTM", Dec. 2018, Physica A 519.*

Wichard et al. "Time Series Prediction with Ensemble Models", 2004, 2004 IEEE International Joint Conference on Neural Networks.*

Dong et al. "Research on Shape-Based Time Series Similarity Measure", 2006, Proceedings of the Fifth International Conference on Machine Learning and Cybernetics.*

Nakamura et al. "A shape-based similarity measure for time series data with ensemble learning", 2013, Pattern Analysis and Applications.*

Qin et al., "A Dual-Stage Attention-Based Recurrent Neural Network for Time Series Prediction", IJCAI 2017, Aug. 2017, pp. 2627-2633.

Lai et al., "Modeling Long- and Short-Term Temporal Patterns with Deep Neural Networks", SIGIR 2018, arXiv:1703.07015v3 [cs.LG] Apr. 18, 2018, pp. 1-11.

Salinas et al., "DeepAR: Probabilistic Forecasting with Autoregressive Recurrent Networks", International Journal of Forecasting, arXiv:1704.04110v3 [cs.AI] Feb. 22, 2019, pp. 1-12.

* cited by examiner

ENSEMBLE OF CLUSTERED DUAL-STAGE ATTENTION-BASED RECURRENT NEURAL NETWORKS FOR MULTIVARIATE TIME SERIES PREDICTION

RELATED APPLICATION INFORMATION

This application claims priority to U.S. Provisional Patent Application Ser. No. 62/884,338, filed on Aug. 8, 2019, incorporated herein by reference its entirety.

BACKGROUND

Technical Field

The present invention relates to information processing and more particularly to an ensemble of clustered dual-stage attention-based Recurrent Neural Networks (RNNs) for multivariate time series prediction.

Description of the Related Art

Multivariate time series prediction can benefit many real world applications, such as financial market prediction, medical diagnosis, weather forecasting, communication network traffic forecasting, predictive maintenance, and others.

There have been several types of studies for the multivariate time series prediction problem. Three key types include the following: (1) linear techniques such as Auto Regressive Moving Average (ARMA) or Auto Regressive Integrated Moving Average (ARIMA) models; (2) probabilistic models such as Gaussian processes (GPs); and (3) deep neural networks such as Long Short-Term Memories (LSTMs).

However, these methods are limited by the following reasons: (1) linear methods cannot capture the underlying nonlinear relationships; (2) probabilistic models employ a pre-defined nonlinear form and may not be flexible to capture complex relationships; and (3) existing deep neural networks, e.g., LSTM, do not consider the structural info of hidden features (input data) and cannot handle multiple types of historical data.

SUMMARY

According to aspects of the present invention, a computer-implemented method for multivariate time series prediction is provided. The method includes decomposing each time series from among a batch of multiple driving time series and a target time series into a raw component, a shape component, and a trend component. The method further includes, for each of the decomposed components, selecting a driving time series relevant thereto from the batch and obtaining hidden features of the selected driving time series, by applying the batch to an input attention-based encoder of an Ensemble of Clustered dual-stage attention-based Recurrent Neural Networks (EC-DARNNS). The method also includes automatically clustering, by a hardware processor, the hidden features in a hidden space using a temporal attention-based decoder of the EC-DARNNS. Each of the Clustered dual-stage attention-based RNNs in the Ensemble is dedicated and applied to a respective one of the decomposed components. The method additionally includes predicting a respective value of one or more future time steps for the target series based on respective prediction outputs for each of the decomposed components by the EC-DARNNS.

According to other aspects of the present invention, a computer program product for multivariate time series prediction is provided. The computer program product includes a non-transitory computer readable storage medium having program instructions embodied therewith. The program instructions are executable by a computer to cause the computer to perform a method. The method includes decomposing each time series from among a batch of multiple driving time series and a target time series into a raw component, a shape component, and a trend component. The method further includes, for each of the decomposed components, selecting a driving time series relevant thereto from the batch and obtaining hidden features of the selected driving time series, by applying the batch to an input attention-based encoder of an Ensemble of Clustered dual-stage attention-based Recurrent Neural Networks (EC-DARNNS). The method also includes automatically clustering the hidden features in a hidden space using a temporal attention-based decoder of the EC-DARNNS. Each of the Clustered dual-stage attention-based RNNs in the Ensemble is dedicated and applied to a respective one of the decomposed components. The method additionally includes predicting a respective value of one or more future time steps for the target series based on respective prediction outputs for each of the decomposed components by the EC-DARNNS.

According to yet other aspects of the present invention, a computer processing system for multivariate time series prediction is provided. The computer processing system includes a memory for storing program code. The computer processing system further includes a processor operatively coupled to the memory for executing the program code to decompose each time series from among a batch of multiple driving time series and a target time series into a raw component, a shape component, and a trend component. The processor further executes the program code to, for each of the decomposed components, select a driving time series relevant thereto from the batch and obtain hidden features of the selected driving time series, by applying the batch to an input attention-based encoder of an Ensemble of Clustered dual-stage attention-based Recurrent Neural Networks (EC-DARNNS). The processor also executes the program code to automatically cluster the hidden features in a hidden space using a temporal attention-based decoder of the EC-DARNNS. Each of the Clustered dual-stage attention-based RNNs in the Ensemble is dedicated and applied to a respective one of the decomposed components. The processor additionally runs the program code to predict a respective value of one or more future time steps for the target series based on respective prediction outputs for each of the decomposed components by the EC-DARNNS.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for multivariate time series prediction using an ensemble of clustered dual-stage attention-based Recurrent Neural Networks (RNNS).

More specifically in relation to an illustrative embodiment, given the historical data of multiple driving time series as well as the target time series from time step 1 to T, the present invention predicts the future target time series values from time T+1 to T+N. As one non-limiting example, the present invention can be applied to perform indoor temperature forecasting for energy efficiency. In this case, the indoor temperature is the target series, the driving series will include relative humidity, carbon dioxide in ppm, rain or not, outdoor temperature, and so forth.

In order to address this problem, one or more embodiments of the present invention propose an end-to-end deep encoder-decoder framework, i.e., Ensemble of Clustered Dual-stage Attention-based Recurrent Neural Networks (EC-DARNNs), to perform multivariate time series prediction.

In an embodiment, the present invention performs multivariate time series prediction as follows. First, the raw time series data is decomposed into three different components: raw; shape; and trend. Then, for each component, a batch of multiple driving series is input to the input attention-based encoder to select relevant driving series and obtain hidden features. Next, the hidden features are automatically clustered in the hidden space based upon a Gaussian mixture model. Finally, the clustered hidden features and the target series are employed in decoders and the output of the decoders from different components are used to predict the values of future time steps.

Figure 1:
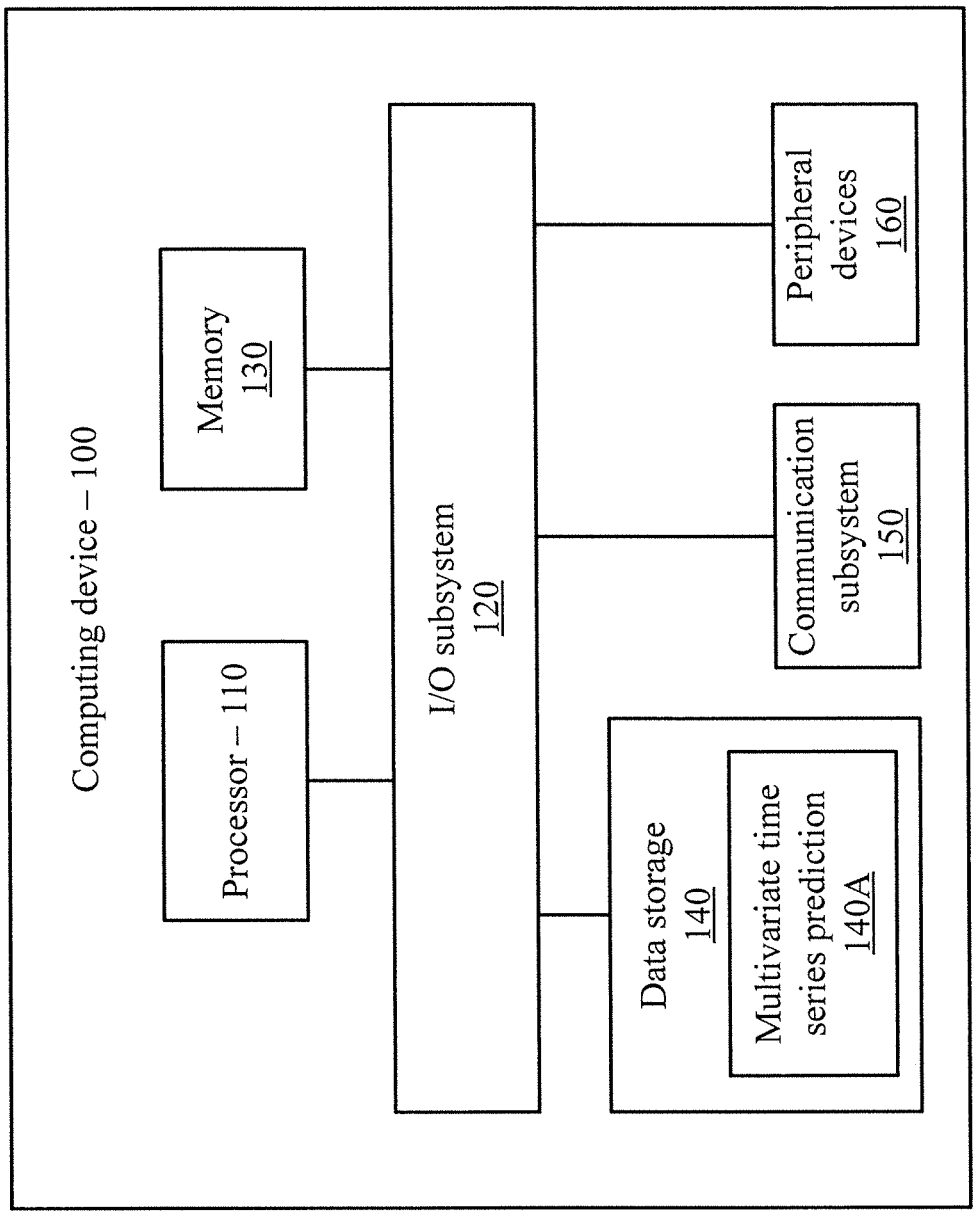
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform multivariate time series prediction.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code 140A for multivariate time series prediction. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
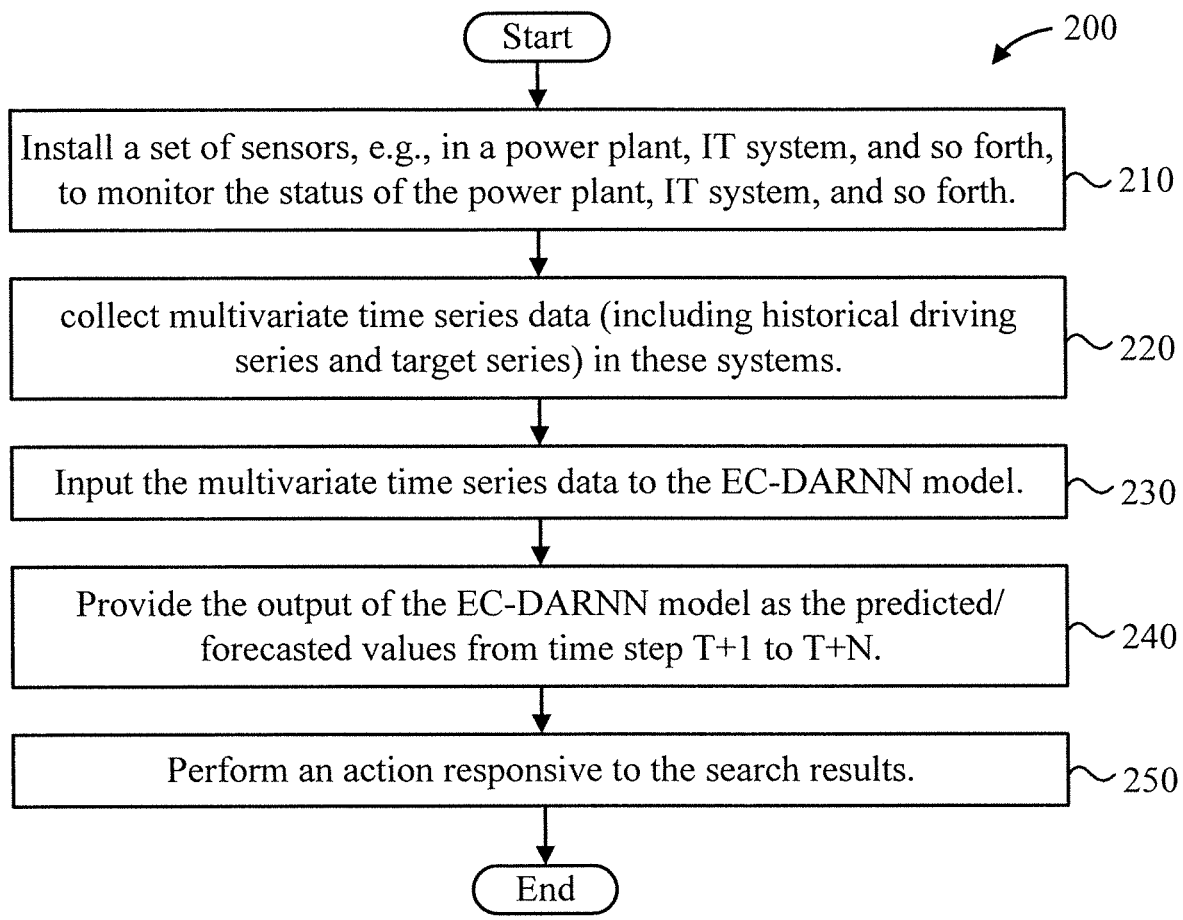
FIG. 2 is a block diagram showing an exemplary method for multivariate time series prediction using an ensemble of clustered dual-state attention-based RNNS, in accordance with an embodiment of the present invention.

FIG. 2 is a block diagram showing an exemplary method 200 for multivariate time series prediction using an ensemble of clustered dual-state attention-based RNNS, in accordance with an embodiment of the present invention.

At block 210, install a set of sensors, e.g., in a power plant, IT system, and so forth, to monitor the status of the power plant, IT system, and so forth.

At block 220, collect multivariate time series data (including historical driving series and target series) in these systems.

At block 230, input the multivariate time series data to the EC-DARNN model.

At block 240, provide the output of the EC-DARNN model as the predicted/forecasted values from time step T+1 to T+N. The output can be in the form of respective predictions for each of decomposed components including raw, shape, and trend, or can be a single prediction formed from the preceding multiple predictions.

At block 250, perform an action responsive to the search results.

Exemplary actions can include, for example, but are not limited to, recognizing anomalies in computer processing systems and controlling the system in which an anomaly is detected. For example, a query in the form of time series data from a hardware sensor or sensor network (e.g., mesh) can be characterized as anomalous behavior (dangerous or otherwise too high operating speed (e.g., motor, gear junction), dangerous or otherwise excessive operating heat (e.g., motor, gear junction), dangerous or otherwise out of tolerance alignment (e.g., motor, gear junction, etc.) using a text message as a label. In a processing pipeline, an initial input time series can be processed into multiple text messages and then recombined to include a subset of the text messages for a more focused resultant output time series with respect to a given topic (e.g., anomaly type). Accordingly, a device may be turned off, its operating speed reduced, an alignment (e.g., hardware-based) procedure is performed, and so forth, based on the implementation.

Another exemplary action can be operating parameter tracing where a history of the parameters change over time can be logged as used to perform other functions such as hardware machine control functions including turning on or off, slowing down, speeding up, positionally adjusting, and so forth upon the detection of a given operation state equated to a given output time series and/or text comment relative to historical data.

Exemplary environments where the present invention can be deployed include, but are not limited to, power plants, information technology systems, manufacturing plants, and so forth. These and other environments are readily contemplated by one of ordinary skill in the art, given the teachings of the present invention provided herein.

Figure 3:
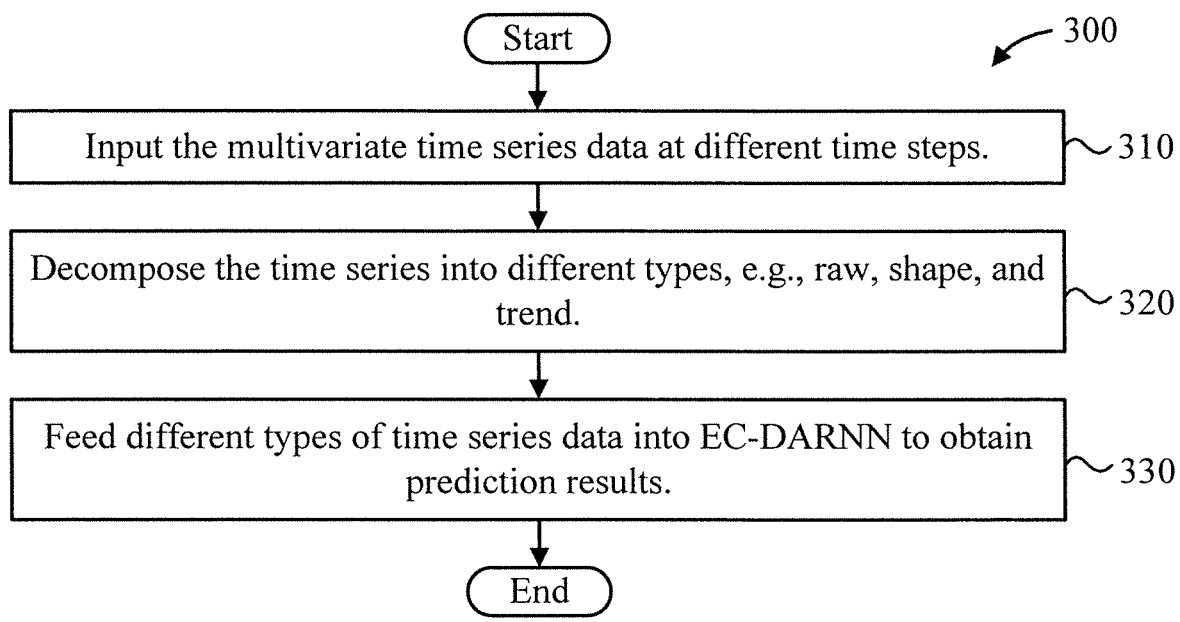
FIG. 3 is a block diagram further showing various blocks of FIG. 2, in accordance with an embodiment of the present invention.

FIG. 3 is a block diagram further showing blocks 230 and 240 of FIG. 2, in accordance with an embodiment of the present invention.

At block 310, input the multivariate time series data at different time steps.

At block 320, decompose the time series into different types, e.g., raw, shape, and trend. The raw type includes the original time series segment. The shape type includes the original time series segment minus the values of each time series at T time step. The trend type includes the value difference of two consecutive time steps.

At block 330, feed different types of time series data into EC-DARNN to obtain prediction results.

Figure 4:
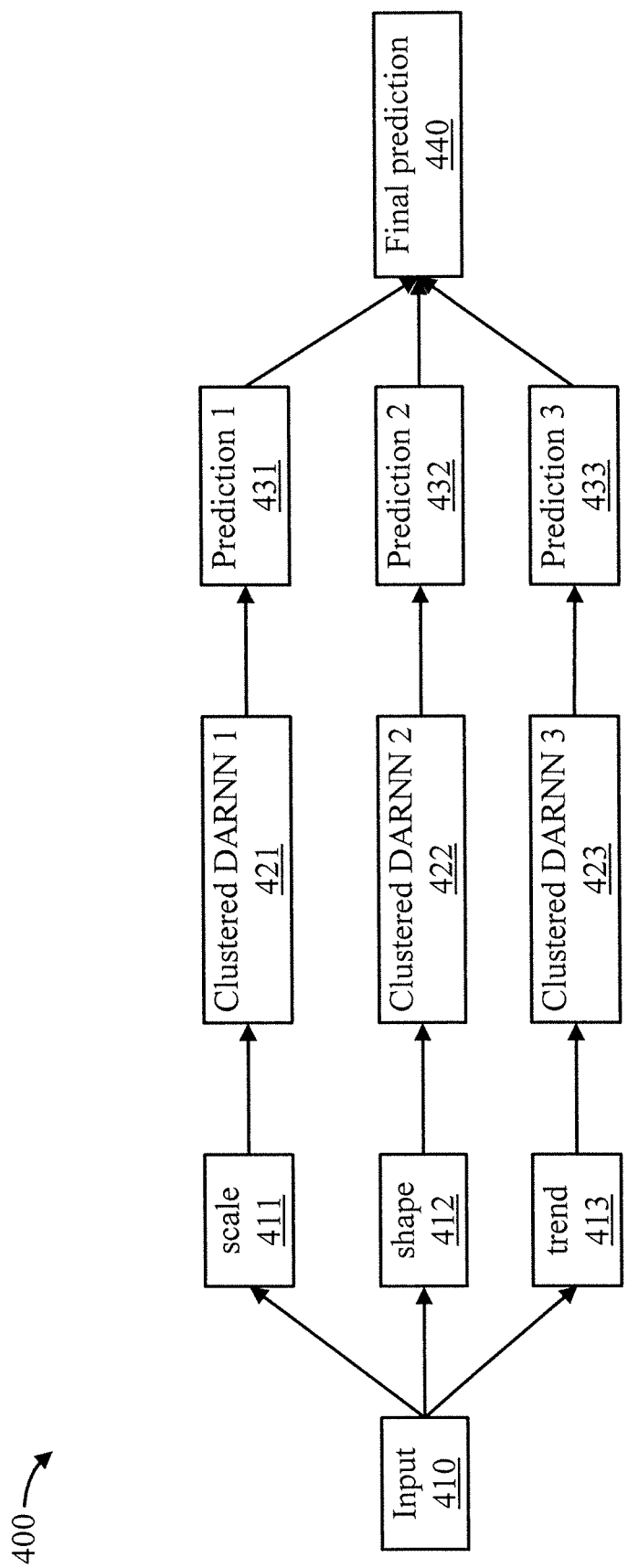
FIG. 4 is a block diagram showing an exemplary framework of an EC-DARNN model, in accordance with an embodiment of the present invention.

FIG. 4 is a block diagram showing an exemplary framework 400 of an EC-DARNN model, in accordance with an embodiment of the present invention.

The framework 400 includes an input 410 from which are obtained different types of input time series including scale 411, shape 422, and trend 413.

A clustered DARNN 1 421 processes the scale input time series 411 to learn the hidden representation (features) of that type to generate a first prediction 431.

A clustered DARNN 2 422 processes the shape input time series 412 to learn the hidden representation (features) of that type to generate a second prediction 432.

A clustered DARNN 3 423 processes the trend input time series 413 to learn the hidden representation (features) of that type to generate a third prediction 433.

From the first prediction 431, the second prediction 432, and the third prediction 443, a final prediction 440 is generated based on an attention mechanism which can adaptively select the important factors.

Figure 5:
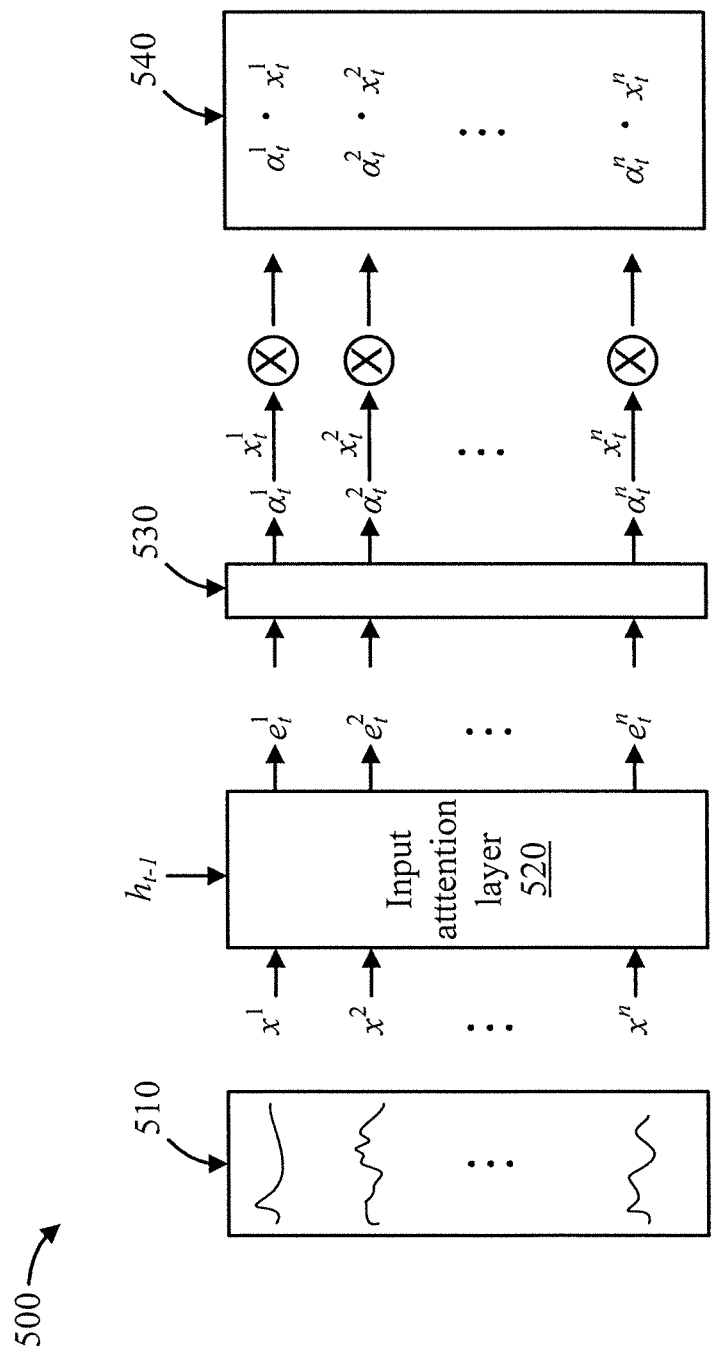
FIG. 5 is a block diagram showing an exemplary framework of an input attention mechanism of a clustered DARNN model, in accordance with an embodiment of the present invention.

FIG. 5 is a block diagram showing an exemplary framework 500 of an input attention mechanism of a clustered DARNN model, in accordance with an embodiment of the present invention.

The framework 500 involves a driving series 510 of length T, an input attention layer 520, a softmax layer 530, and a new input 540 at time t.

Figure 6:
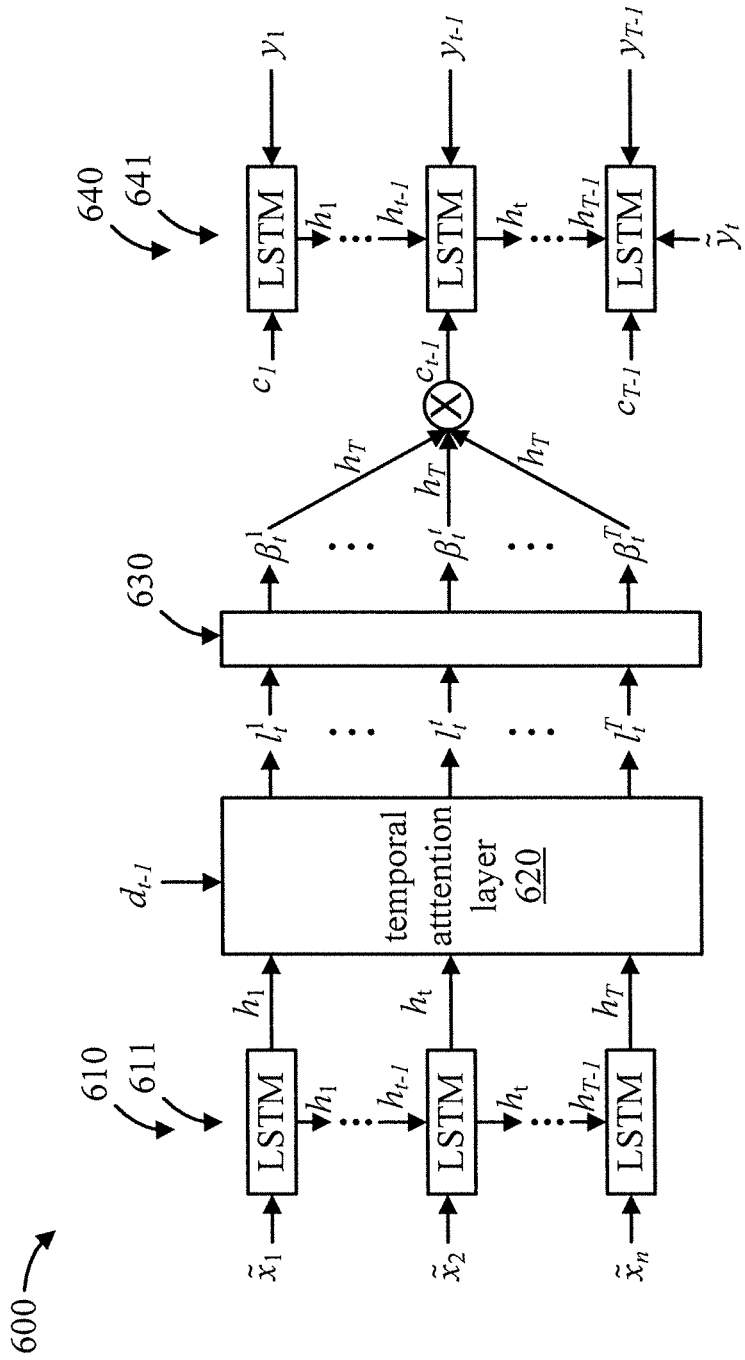
FIG. 6 is a block diagram showing an exemplary framework of a temporal attention mechanism of a clustered DARNN model, in accordance with an embodiment of the present invention.

FIG. 6 is a block diagram showing an exemplary framework 600 of a temporal attention mechanism of a clustered DARNN model, in accordance with an embodiment of the present invention.

The framework 600 involves an encoder 610 formed from a set of LSTMs 611, a temporal attention layer 620, a softmax layer 630, and a decoder 640 formed from another set of LSTMs 641.

Figure 7:
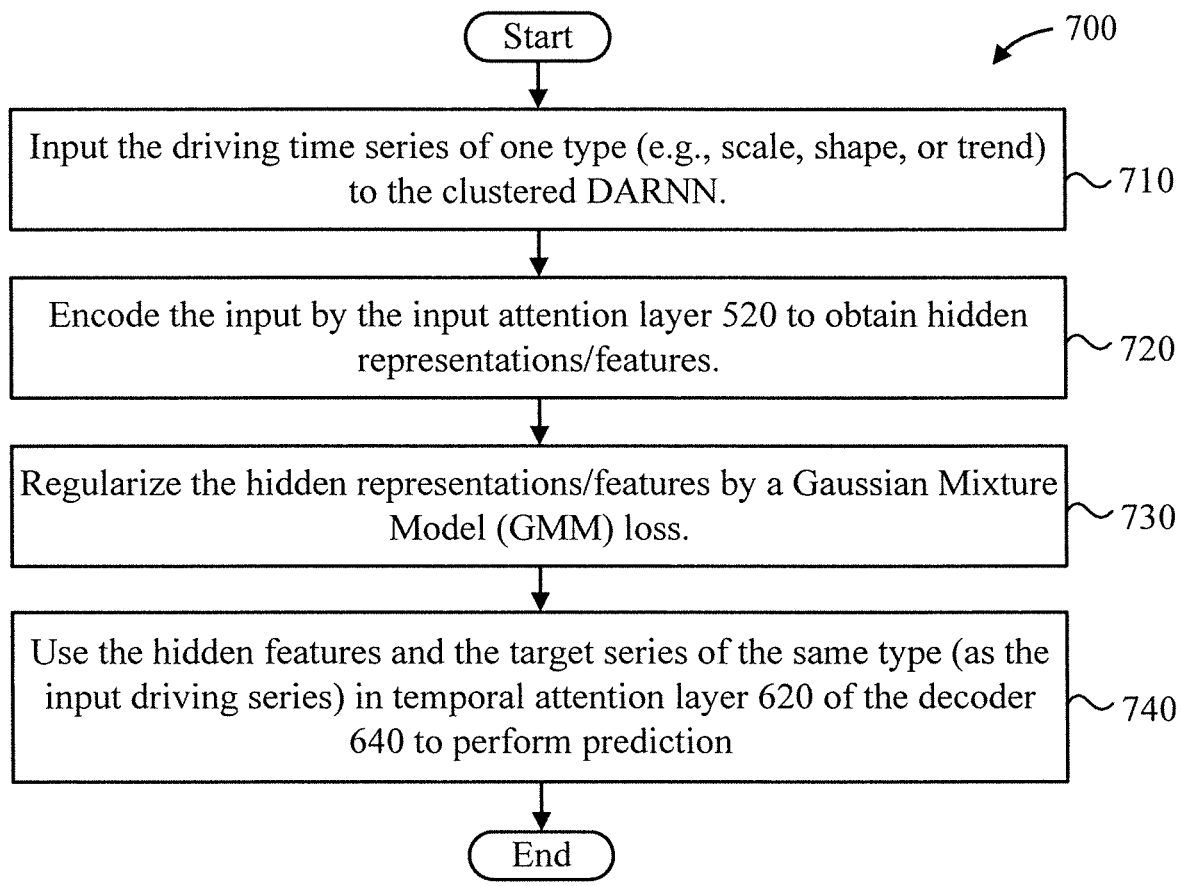
FIG. 7 is a flow diagram showing an exemplary method for using a clustered DARNN model, in accordance with an embodiment of the present invention.

FIG. 7 is a flow diagram showing an exemplary method 700 for using a clustered DARNN model, in accordance with an embodiment of the present invention.

At block 710, input the driving time series of one type (e.g., scale, shape, or trend) to the clustered DARNN.

At block 720, encode the input by the input attention layer 520 to obtain hidden representations/features which are obtained based on the relevant time steps.

At block 730, regularize the hidden representations/features by a Gaussian Mixture Model (GMM) loss.

At block 740, use the hidden features and the target series of the same type (as the input driving series) in temporal attention layer 620 of the decoder 640 to perform prediction based on the relevant temporal hidden features.

Figure 8:
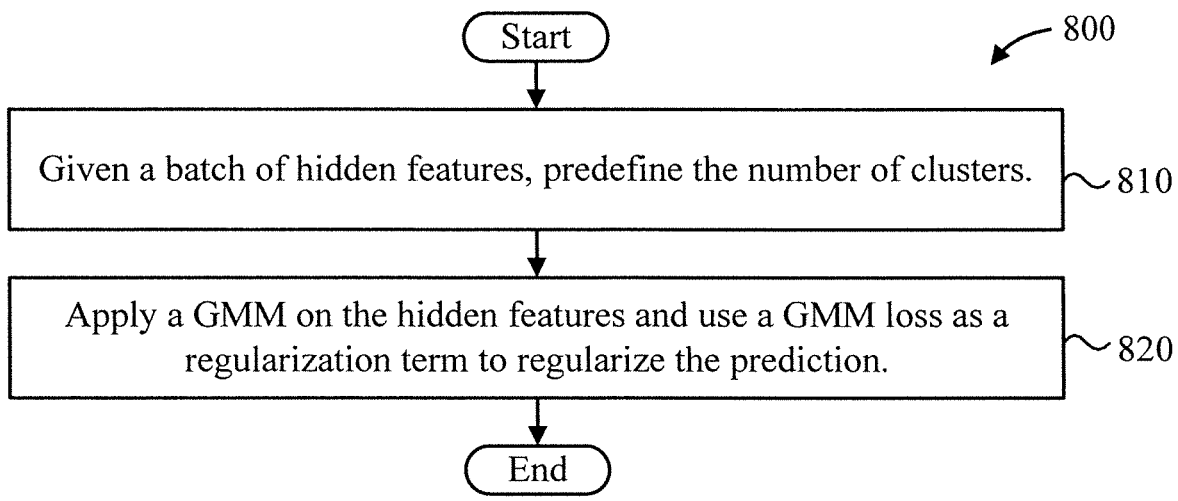
FIG. 8 is a flow diagram showing an exemplary method for feature regularization, in accordance with an embodiment of the present invention.

FIG. 8 is a flow diagram showing an exemplary method 800 for feature regularization, in accordance with an embodiment of the present invention.

At block 810, given a batch of hidden features, predefine the number of clusters.

At block 820, apply a GMM on the hidden features and use a GMM loss as a regularization term to regularize the prediction.

Figure 9:
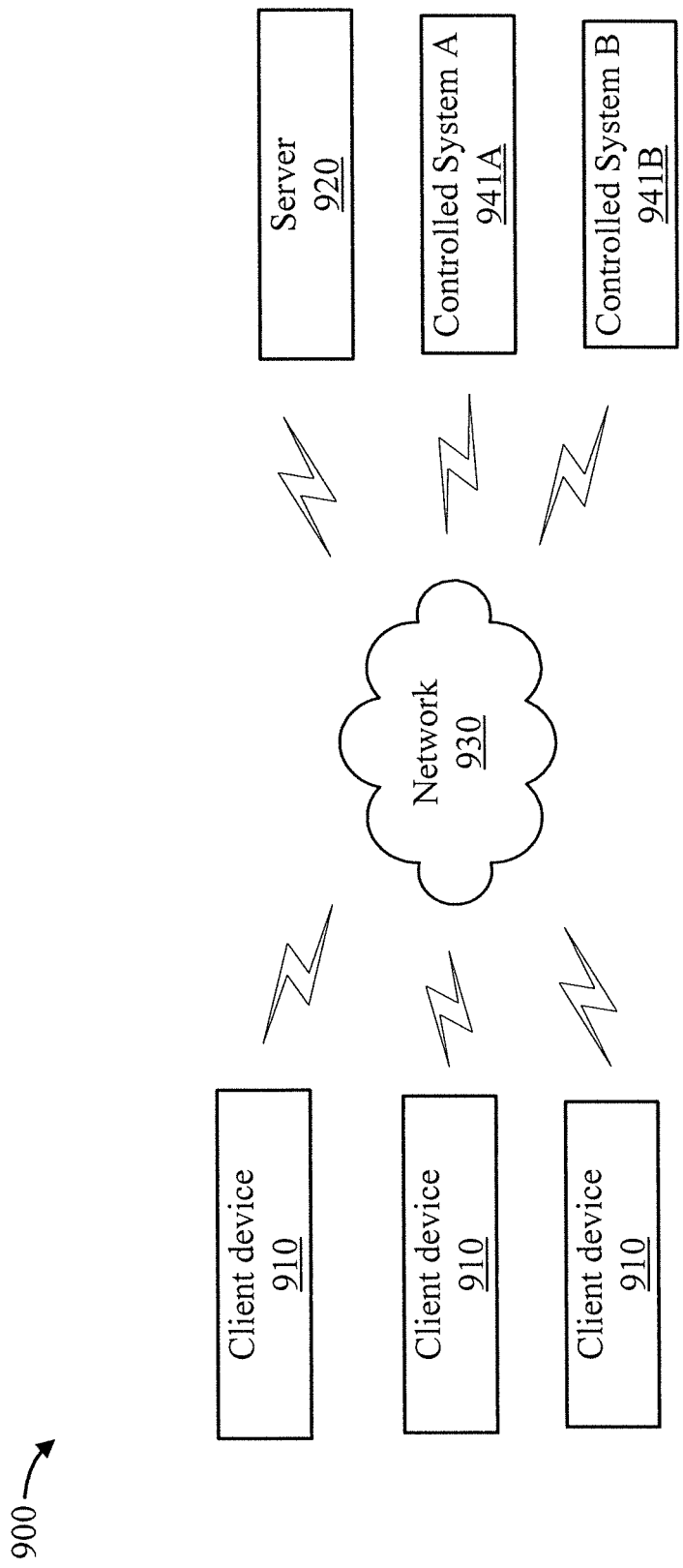
FIG. 9 is a block diagram showing an exemplary computing environment, in accordance with an embodiment of the present invention.

FIG. 9 is a block diagram showing an exemplary computing environment 900, in accordance with an embodiment of the present invention.

The environment 900 includes a server 910, multiple client devices (collectively denoted by the figure reference numeral 920), a controlled system A 941, a controlled system B 942.

Communication between the entities of environment 700 can be performed over one or more networks 930. For the sake of illustration, a wireless network 930 is shown. In other embodiments, any of wired, wireless, and/or a combination thereof can be used to facilitate communication between the entities.

The server 910 receives time series data from client devices 920. The server 910 may control one of the systems 941 and/or 942 based on a prediction generated thereby. In an embodiment, the time series data can be data related to the controlled systems 941 and/or 942 such as, for example, but not limited to sensor data.

Some of the many attendant advantages of EC-DARNN from previous works include, but are not limited to:

(1) The previous deep neural network based time series prediction techniques do not explicitly consider the structural info of hidden features (input data) while EC-DARNNs tackles this issue by using a Gaussian mixture model over the hidden features.

(2) Conventional deep neural network-based time series prediction techniques cannot handle multiple types of historical time series data while EC-DARNNs addresses this issue via the ensemble of several base clustered-DARNN with a unified objective.

EC-DARNNs is the first model which considers the structural info of hidden features (input data) and utilizes multiple types of historical time series data to make time series predictions. These and other attendant advantages are readily contemplated by one of ordinary skill in the art, given the teachings of the present invention provided herein.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for multivariate time series prediction, comprising:
    decomposing each time series from among a batch of multiple driving time series and a target time series into a raw component, a shape component, and a trend component, the shape component including an original time series segment minus values of each time series at T time step, and the trend component including a value difference of two consecutive time steps;
    for each of the decomposed components, selecting a driving time series relevant thereto from the batch and obtaining hidden features of the selected driving time series, by applying the batch to an input attention-based encoder of an Ensemble of Clustered dual-stage attention-based Recurrent Neural Networks (EC-DARNNS);
    automatically clustering, by a hardware processor, the hidden features in a hidden space using a temporal attention-based decoder of the EC-DARNNS, each of the Clustered dual-stage attention-based Recurrent Neural Networks (RNNs) in the Ensemble being dedicated and applied to a respective one of the decomposed components; and
    predicting a respective value of one or more future time steps for the target time series based on respective prediction outputs for each of the decomposed components by the EC-DARNNS.

2. The computer-implemented method of claim 1, wherein said automatically clustering step automatically clusters the hidden features in the hidden space based upon a Gaussian Mixture Model (GMM).

3. The computer-implemented method of claim 2, wherein the Gaussian Mixture Model is used for hidden feature regularization.

4. The computer-implemented method of claim 3, wherein the hidden features are regularized with respect to a GMM loss implemented as a regularization term.

5. The computer-implemented method of claim 1, wherein the batch of multiple driving time series represents historical data.

6. The computer-implemented method of claim 1, wherein the input attention-based encoder comprises a plurality of Long-Short-Term Memories (LTSMs).

7. The computer-implemented method of claim 6, wherein the input attention-based encoder further comprises one or more input attention layers followed h one or more softmax layers.

8. The computer-implemented method of claim 7, wherein the plurality of LSTMs precede the one or more input attention layers.

9. The computer-implemented method of claim 1, wherein the temporal attention-based decoder comprises a plurality of Long-Short-Term Memories (LTSMs).

10. The computer-implemented method of claim 9, wherein the temporal attention-based decoder further comprises one or more temporal attention layers followed by one or more softmax layers.

11. The computer-implemented method of claim 10, wherein the plurality of LSTMs precede the one or more temporal attention layers.

12. The computer-implemented method of claim 1, wherein the target time series comprises time series data of at least one hardware sensor for anomaly detection of a hardware system.

13. The computer-implemented method of claim 12, wherein the hardware system is controlled responsive to the respective value of the one or more future time steps.

14. A computer program product for multivariate time series prediction, the computer program product comprising a non-transitory computer readable storage medium having program instructions embodied therewith, the program instructions executable by a computer to cause the computer to perform a method comprising:
    decomposing each time series from among a batch of multiple driving time series and a target time series into a raw component, a shape component, and a trend component, the shape component including an original time series segment minus values of each time series at T time step, and the trend component including a value difference of two consecutive time steps;
    for each of the decomposed components, selecting a driving time series relevant thereto from the batch and obtaining hidden features of the selected driving time series, by applying the batch to an input attention-based encoder of an Ensemble of Clustered dual-stage attention-based Recurrent Neural Networks (EC-DARNNS);

automatically clustering the hidden features in a hidden space using a temporal attention-based decoder of the EC-DARNNS, each of the Clustered dual-stage attention-based Recurrent Neural Networks (RNNs) in the Ensemble being dedicated and applied to a respective one of the decomposed components; and predicting a respective value of one or more future time steps for the target time series based on respective prediction outputs for each of the decomposed components by the EC-DARNNS.

15. The computer program product of claim 14, wherein said automatically clustering step automatically clusters the hidden features in the hidden space based upon a Gaussian Mixture Model (GMM).

16. The computer program product of claim 15, wherein the Gaussian Mixture Model is used for hidden feature regularization.

17. The computer program product of claim 16, wherein the hidden features are regularized with respect to a GMM loss implemented as a regularization term.

18. The computer program product of claim 14, wherein the batch of multiple driving time series represents historical data.

19. The computer program product of claim 14, wherein the input attention-based encoder comprises a plurality of Long-Short-Term Memories (LTSMs).

20. A computer processing system for multivariate time series prediction, comprising:

a memory for storing program code; and a processor operatively coupled to the memory for executing the program code to:

decompose each time series from among a batch of multiple driving time series and a target time series into a raw component, a shape component, and a trend component, the shape component including an original time series segment minus values of each time series at T time step, and the trend component including a value difference of two consecutive time steps;

for each of the decomposed components, select a driving time series relevant thereto from the batch and obtain hidden features of the selected driving time series, by applying the batch to an input attention-based encoder of an Ensemble of Clustered dual-stage attention-based Recurrent Neural Networks (EC-DARNNS);

automatically cluster the hidden features in a hidden space using a temporal attention-based decoder of the EC-DARNNS, each of the Clustered dual-stage attention-based Recurrent Neural Networks (RNNs) in the Ensemble being dedicated and applied to a respective one of the decomposed components; and predict a respective value of one or more future time steps for the target time series based on respective prediction outputs for each of the decomposed components by the EC-DARNNS.

* * * * *